Figure 1:
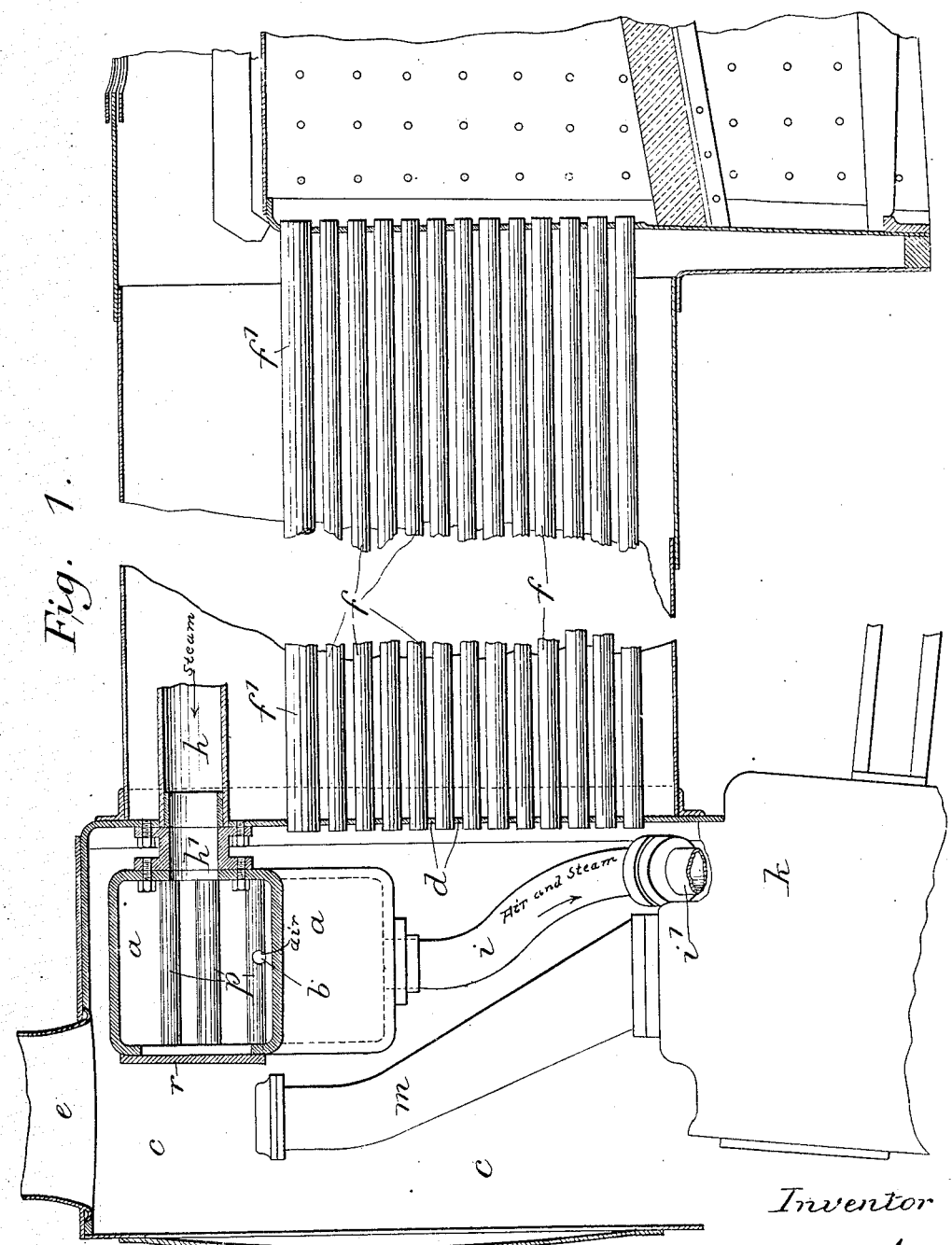

No. 860,455. PATENTED JULY 16, 1907.
E. FIELD.
LOCOMOTIVE AND OTHER ENGINE USING A MIXTURE OF AIR AND STEAM AS A MOTIVE FLUID.
APPLICATION FILED DEC. 12, 1905.
6 SHEETS—SHEET 2.

No. 860,455.

E. FIELD.

PATENTED JULY 16, 1907.

LOCOMOTIVE AND OTHER ENGINE USING A MIXTURE OF AIR AND STEAM AS A MOTIVE FLUID.

APPLICATION FILED DEC. 12, 1905.

6 SHEETS—SHEET 4.

No. 860,455. PATENTED JULY 16, 1907.
E. FIELD.
LOCOMOTIVE AND OTHER ENGINE USING A MIXTURE OF AIR AND STEAM
AS A MOTIVE FLUID.
APPLICATION FILED DEC. 12, 1905.

6 SHEETS—SHEET 5.

Witnesses:

Inventor:
Edward Field

No. 860,455. PATENTED JULY 16, 1907.
E. FIELD.
LOCOMOTIVE AND OTHER ENGINE USING A MIXTURE OF AIR AND STEAM AS A MOTIVE FLUID.
APPLICATION FILED DEC. 12, 1905.

6 SHEETS—SHEET 6.

UNITED STATES PATENT OFFICE.

EDWARD FIELD, OF LONDON, ENGLAND, ASSIGNOR TO THE NEW CENTURY ENGINE COMPANY, LIMITED, OF LONDON, ENGLAND.

LOCOMOTIVE AND OTHER ENGINE USING A MIXTURE OF AIR AND STEAM AS A MOTIVE FLUID.

No. 860,455.           Specification of Letters Patent.           Patented July 16, 1907.

Application filed December 12, 1905. Serial No. 291,371.

*To all whom it may concern:*

Be it known that I, EDWARD FIELD, a subject of the King of Great Britain and Ireland, residing at London, England, have invented Improvements in Locomotive and other Engines Using a Mixture of Air and Steam as Motive Fluid, of which the following is a specification.

To reduce the consumption of steam and consequently of fuel in locomotives without reducing their power and thus to enable railways to be worked in a more economical manner than usual, there are described in the specification of former Letters Patent No. 753057 improvements in the construction and mode of working locomotive steam engines according to which heat from the hot gases passing from the boiler tubes to the chimney instead of being allowed to escape as waste heat, is utilized to increase the temperature and volume of a mixture of steam and air under pressure which is then used as motive fluid to propel the locomotive, the steam and air at or about the pressure of the steam in the locomotive boiler being supplied respectively from the boiler and from one or more air compressors driven by the engine, and admitted separately and in automatically regulated quantities to and mixed in a heating device arranged in the smoke box of the locomotive so as to be heated by the hot gases flowing therethrough. In this way there is obtained a large volume of motive fluid that is a comparatively bad conductor of heat and from which the steam is therefore not readily condensed upon entering the valve chests and engine cylinders, as is the case when steam only is used, and by the use of which a considerable economy in the fuel consumption of locomotives has been effected without reducing the power of such locomotives.

Now the present invention has for object to enable a mixture of steam and air to be heated to a higher temperature than heretofore by the escaping hot gases so as to enable a still greater economy in working to be effected, and also to simplify the construction and reduce the size of the steam and air heating device so as to facilitate the application of the method of working above described to locomotive and other engines, for example marine engines, by obviating the necessity of enlarging or unduly enlarging the smoke box or boxes of the boilers used for supplying the steam to such engines. For this purpose the multi-tubular boiler of the locomotive, marine or like engine is provided with one or more fire tubes of larger size than usual, say of about three inches in diameter and upward, through which hot gases will flow from the fire box or combustion chamber of the boiler and enter the smoke box at a higher temperature than that of the hot gases flowing through the remaining and ordinary fire tubes of the boiler. There is also used in connection with the boiler, engine cylinders and air compressor or compressors, a steam and air heating device that is in the form of a box or chamber that is arranged in the smoke box between the front tube plate and the up take and in proximity to the large fire tube or tubes so that it will be heated to a high temperature by the hot gases escaping from such tube or tubes as well as by heat from the hot gases escaping from the remaining tubes. By the arrangement described the mixture of steam and air in the heating device will be superheated and increased in volume to a greater extent than heretofore usual.

Means such as baffles or dampers may be provided for regulating the flow of some or all of the hot gases through the fire tubes, and in some cases these baffles or dampers may serve for directing or deflecting such gases so as to bring them into more effective contact with the heating device which is or may be specially adapted for effecting an intimate mixture of the steam and air admitted thereto.

A heating device arranged to be heated as described, can be constructed in various forms.

Figure 2:
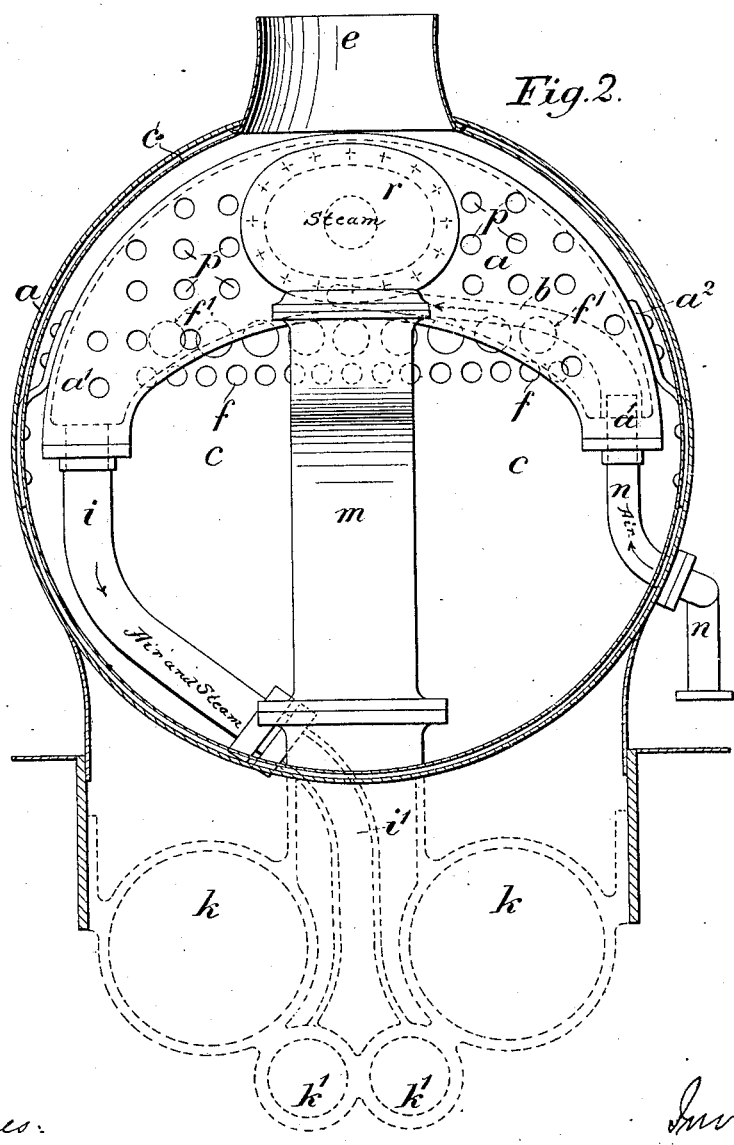
Figure 3:
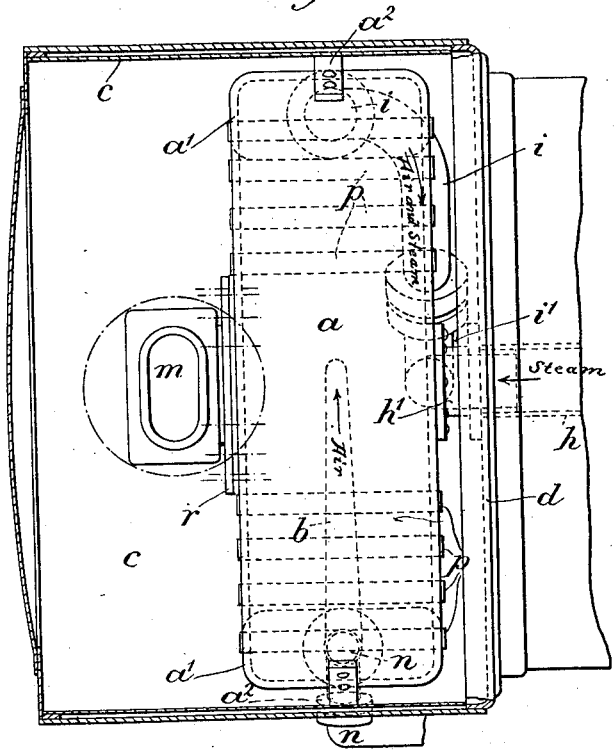

In the accompanying illustrative drawings, Figures 1, 2 and 3 show part of a locomotive engine fitted with apparatus according to this invention, Fig. 1 being a longitudinal sectional elevation, Fig. 2 a cross sectional elevation, and Fig. 3 a sectional plan. Figs 4 and 5 and Figs. 6 and 7 are similar views to Figs. 1 and 2 respectively, showing modified arrangements.

In the arrangement shown in Figs. 1, 2 and 3, the steam and air mixing and heating device comprises a metal box or chamber $a$ of approximately rectangular cross section and of saddle or arch shape in end view, and a perforated bent pipe $b$ that extends into the said chamber. The chamber $a$ is arranged to extend around the upper part of the smoke box $c$ between the front tube plate $d$ and the base of the uptake $e$ and above most of the fire tubes $f$, the upper row $f^1$ of fire tubes being made of larger size than the others as and for the purpose hereinbefore described. The chamber $a$ is connected centrally at its rear side to the main steam supply pipe $h$ of the boiler by a junction pipe $h^1$ and is connected at the lower end of one of its side portions $a^1$ with a mixture outlet pipe $i$ that extends downward through the smoke box $c$ and is connected by the pipe $i^1$ to the valve chests $k^1$ of the engine cylinders $k$. The steam supply pipe $h$ is provided with a regulator or other valve located in the steam dome according to usual locomotive practice; or the valve may be fitted at any other suitable place according to known methods and as may be convenient. To the lower part of the other side portions $a^1$ of the chamber $a$ is connected the air supply pipe $n$ which communicates with the air compressor or compressors. The perforated pipe $b$ within the chamber $a$ is arranged to communicate with and form a continuation of the air pipe $n$. Usually there will be two air compressors operated from the crossheads of the working cylinders of the engine, as in the locomotive engine described in the said former specification, but there may be only one air compressor.

The arrangement is such that when the boiler, engine, and air compressor or compressors are working, the chamber $a$ will be heated to a high temperature by the hot gases flowing through the large and small fire tubes $f^1$, $f$ and particularly by the hot gases flowing through the larger tubes $f^1$, and air under pressure will be delivered through the pipe $n$ into the perforated bent pipe $b$ through the openings in which and the open end thereof it will pass into the portion of the chamber $a$ outside the said pipe and become effectually mixed therein with the steam admitted thereto when the regulator or other valve on the steam supply pipe $h$ is opened, the mixture of air and steam becoming heated to a high temperature and finally flowing off through the outlet pipes $i$ and $i^1$ to the valve chests $k^1$ for use in the cylinders $k$.

The chamber $a$ may be formed, as shown, as a steel casting, or of suitably shaped metal plates connected by angle irons, or in other convenient way, and it is preferably stayed at intervals by means of stays $p$ fitted between the front and back plates. The front plate of the chamber is preferably formed, at a part opposite to the steam pipe $h$, with a manhole provided with a removable cover $r$. The chamber $a$ may be provided with brackets or attachments $a^2$ whereby it can be fixed to the side walls of the smoke box $c$.

The number and size of the large flue tubes may be increased or decreased as required. Thus, instead of using a single upper row $f^1$ of large flue tubes, as shown, two or more rows of large tubes may be used. Or, in some cases, some of the upper small tubes may be replaced by one or a few large tubes for the purpose mentioned.

The air and steam heating and mixing device may be provided with means for increasing its heat absorbing and transferring surface so as to facilitate the passage of heat from the hot gases external to the device to the mixture of steam and air flowing through the device. For this purpose it may be provided with one or more flue tubes, as shown, for examples, in Figs. 1 and 2, where the stays $p$ are shown as tubular stays to serve as flue tubes for the purpose mentioned.

Figure 4:
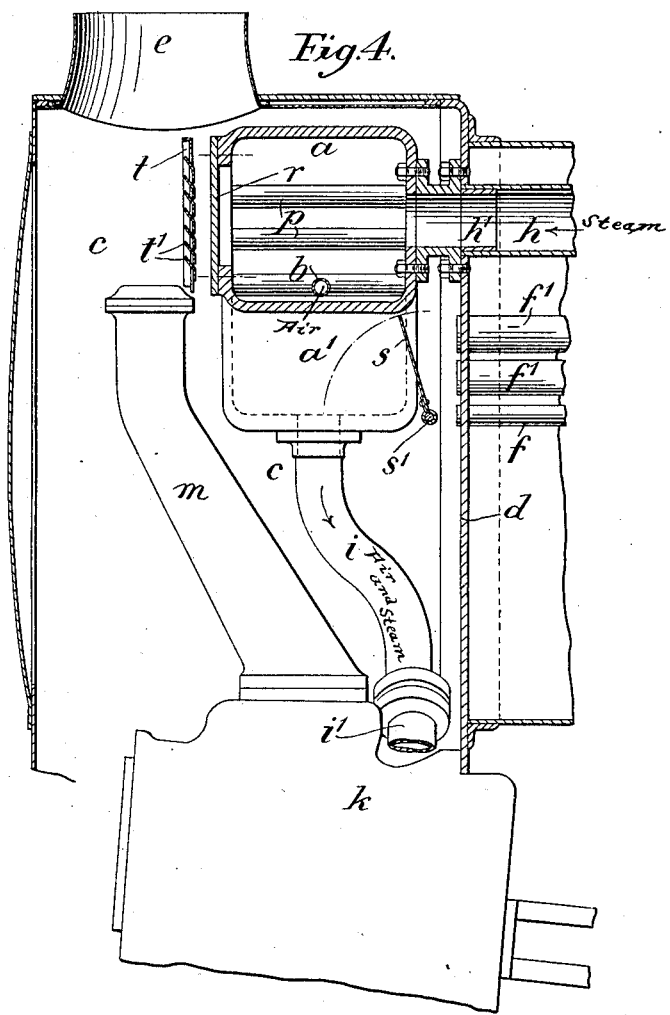
Figure 5:
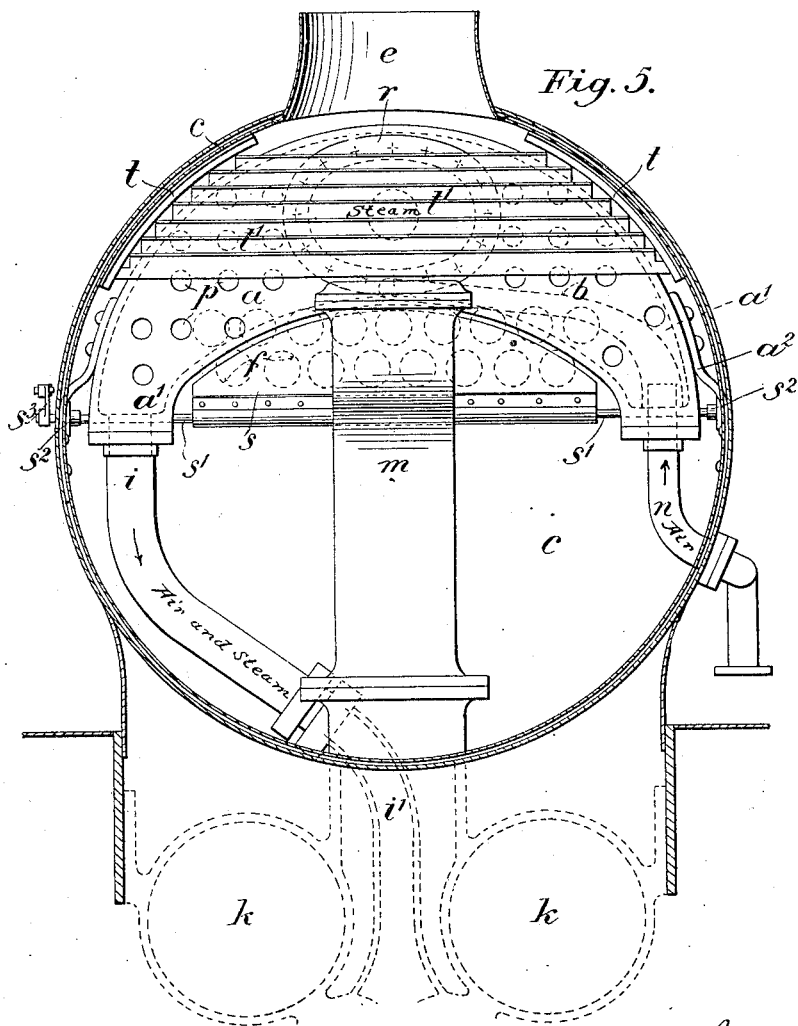

A damper or deflector $s$ may, as shown in Figs. 4 and 5, be pivoted below the outlet ends of the larger fire tubes $f^1$, of which in this example there are two rows, in such a way that it will extend in an upwardly and outwardly inclined direction from the front tube plate $d$ to the lower part of the heating chamber $a$, and at the upper front side of the chamber $a$ may be arranged means, such as a louver device, comprising a frame $t$ and inclined slats $t^1$, past which the blast from the blast pipe $m$ will flow, the arrangement being such that the blast will induce hot gases to flow from the firebox through the larger fire tubes $f^1$ and over and about the heating chamber $a$ and also through the tubular stays $p$ therein, so as to effectually heat the air and steam in the chamber to a high temperature. The damper or deflector $s$ may be carried by a shaft $s^1$ mounted in bearings $s^2$ supported by the sides of the smoke box $c$ and adapted to be operated by an external lever $s^3$, or by other convenient means. The louver device $t$ $t^1$ may be suitably connected, as by the frame $t$, to the sides of the smoke box $c$, or it may be to the chamber $a$. Instead of the louver arrangement shown any other equivalent device may be employed.

Figure 6:
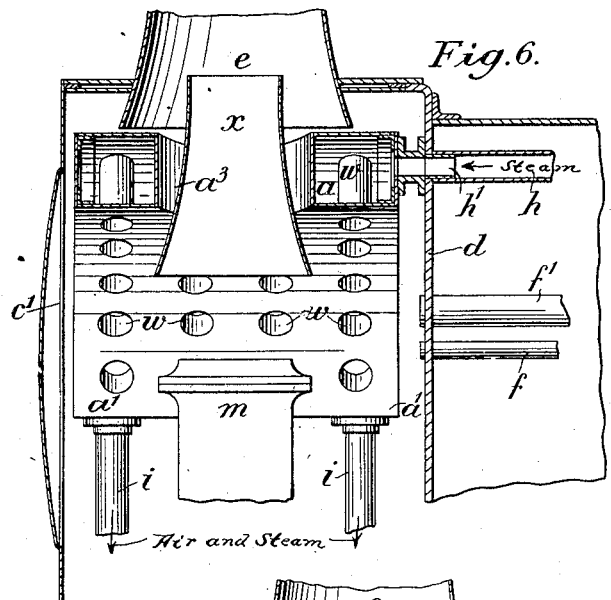
Figure 7:
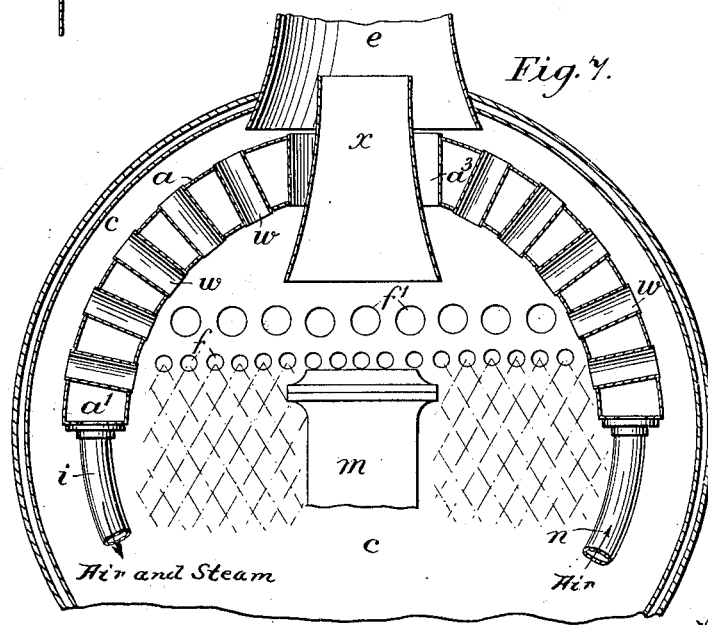

In the further modified arrangement shown in Figs. 6 and 7, the heating chamber $a$, of a more or less saddle shape, has considerably greater longitudinal width than it has according to the previously described arrangement, so that it extends around the upper part of the smoke box below the uptake $e$. In the example it extends from the front tube plate $d$ nearly to the smoke box door $c^1$, thus occupying the greater portion of the upper part of the smoke box $c$, though this is not necessarily the case. The chamber $a$, is in this example, provided with a number of flue tubes $w$ extending radially and upwardly or outwardly through it and with a large centrally arranged opening $a^3$ through which extends a pipe or bonnet $x$, of conical shape, that is located over the blast pipe $m$ and enters the lower, preferably flared end of the uptake $e$, the arrangement being such that exhaust steam passing upward through the pipe or bonnet $x$ from the blast pipe $m$ will induce hot gases from the boiler fire tubes $f$ and $f^1$ to flow through the flue tubes $w$ and over the top and sides of the chamber $a$ and obviate any liability of the escaping exhaust steam exerting a cooling effect on the chamber.

By the construction and arrangement of a heating device such as described, no part of such device need extend below the lowest fire tubes of the boiler, or beyond, or much beyond, the base of the uptake, so that practically all parts of the heating device will be raised to a high temperature and be effective in raising the temperature of the mixture of steam and air flowing through it.

Having now particularly described and ascertained the nature of the said invention and in what manner the same is to be performed, we declare that what we claim is:—

1. Apparatus for preparing and applying as motive fluid a heated mixture of steam and air, comprising a steam boiler, a smoke box through which hot gases from the boiler furnace pass, a mixing and heating chamber located in the upper part of said smoke box so as to be heated by the furnace gases passing therethrough, means for conveying hot gases from the boiler furnace to the smoke box adjacent to said mixing and heating chamber at a temperature higher than that of the gases ordinarily passing to the smokebox, means for supplying steam from the boiler to said chamber, means for supplying air under pressure to said chamber, and an engine to which the heated mixture of steam and air is supplied from the said chamber, substantially as set forth.

2. Apparatus for preparing and applying as motive fluid a heated mixture of steam and air, comprising a multitubular steam boiler having one of its upper tubes larger than the other tubes, a smoke box through which hot gases from the boiler furnace pass, a mixing and heating chamber located in the upper part of said smoke box adjacent to the outlet end of said larger tube, means for supplying steam from the boiler to said chamber, means for supplying air under pressure to said chamber, and an engine to which the heated mixture of steam and air is supplied from the said chamber, substantially as set forth.

3. Apparatus for preparing and applying as motive fluid a heated mixture of steam and air comprising a multitubular steam boiler having a number of its upper fire tubes larger than the other tubes, a smoke box through which hot gases from the boiler furnace pass by way of the tubes, a mixing and heating chamber located in the upper part of said smoke box adjacent to the outlet ends of said larger tubes, means for supplying steam from the boiler to said chamber, means for supplying air under pressure to said chamber, and an engine to which the heated mixture of steam and air is supplied from the said chamber, substantially as set forth.

4. Apparatus for preparing and applying as motive fluid a heated mixture of steam and air, comprising a multitubular steam boiler having the uppermost row of fire tubes larger than the other tubes, a smoke box through which hot gases from the boiler furnace pass by way of the tubes, a mixing and heating chamber located in the upper part of said smokebox adjacent to the outlet ends of said larger tubes, means for supplying steam from the boiler to said chamber, means for supplying air under pressure to said chamber, and an engine to which the heated mixture of steam and air is supplied from the said chamber, substantially as set forth.

5. Apparatus for preparing and applying as motive fluid a heated mixture of steam and air, comprising a steam boiler, a smoke box through which hot gases from the boiler furnace pass, a mixing and heating chamber located in the upper part of said smoke box so as to be heated by the furnace gases passing therethrough, means for causing the hot gases to flow around and over said mixing and heating chamber, means for supplying steam from the boiler to said chamber, means for supplying air under pressure to said chamber, and an engine to which the heated mixture of steam and air is supplied from the said chamber, substantially as set forth.

6. Apparatus for preparing and applying as motive fluid a heated mixture of steam and air, comprising a steam boiler, a smoke box through which hot gases from the boiler furnace pass, a mixing and heating chamber located in the upper part of said smoke box so as to be heated by the furnace gases passing therethrough, a blast pipe for the exhaust steam, means for causing the steam blast to induce hot gases to flow around and over the surface of said mixing and heating chamber, means for supplying steam from the boiler to said chamber, means for supplying air under pressure to said chamber, and an engine to which the heated mixture of steam and air is supplied from the said chamber, substantially as set forth.

7. Apparatus for preparing and applying as motive fluid a heated mixture of steam and air, comprising a steam boiler, a smoke box through which hot gases from the boiler furnace pass, a mixing and heating chamber located in the upper part of said smoke box so as to be heated by the furnace gases passing therethrough, passages extending through said chamber and through which hot gases can flow, means for supplying steam from the boiler to said chamber, means for supplying air under pressure to said chamber, and an engine to which the heated mixture of steam and air is supplied from the said chamber, substantially as set forth.

8. Apparatus for preparing and applying as motive fluid a heated mixture of steam and air, comprising a steam boiler, a smoke box through which hot gases from the boiler furnace pass, a mixing and heating chamber located in the upper part of said smoke box so as to be heated by the furnace gases passing therethrough, passages extending through said chamber, means for inducing hot gases to flow through said passages, means for supplying steam from the boiler to said chamber, means for supplying air under pressure to said chamber, and an engine to which the heated mixture of steam and air is supplied from the said chamber, substantially as set forth.

9. Apparatus for preparing and applying as motive fluid a heated mixture of steam and air, comprising a steam boiler, a smoke box through which hot gases from the boiler furnace pass, a mixing and heating chamber located in the upper part of said smoke box so as to be heated by the furnace gases passing therethrough, passages extending through said chamber, a blast pipe for the exhaust steam, means for causing the steam blast to induce hot gases to flow through said passages, means for supplying steam from the boiler to said chamber, means for supplying air under pressure to said chamber, and an engine to which the heated mixture of steam and air is supplied from the said chamber, substantially as set forth.

10. Apparatus for preparing and applying as motive fluid a heated mixture of steam and air, comprising a steam boiler, a smoke box through which hot gases from the boiler furnace pass, a mixing and heating chamber located in the upper part of said smoke box so as to be heated by the furnace gases passing therethrough, passages extending through said chamber, means for causing hot gases to flow around and over the said mixing and heating chamber and through the passages therein, means for supplying steam from the boiler to said chamber, means for supplying air under pressure to said chamber, and an engine to which the heated mixture of steam and air is supplied from the said chamber, substantially as set forth.

11. Apparatus for preparing and applying as motive fluid a heated mixture of steam and air, comprising a steam boiler, a smoke box through which hot gases from the boiler furnace pass, a mixing and heating chamber located in the upper part of said smoke box so as to be heated by the furnace gases passing therethrough, passages extending through said chamber, a blast pipe for exhaust steam, means for causing the steam blast to induce hot gases to flow over and around said chamber and through the passage therein, means for supplying steam from the boiler to said chamber, means for supplying air under pressure to said chamber, and an engine to which the heated mixture of steam and air is supplied from the said chamber, substantially as set forth.

12. Apparatus for preparing and applying as motive fluid a heated mixture of steam and air, comprising a steam boiler, a smoke box through which hot gases from the boiler furnace pass, a mixing and heating chamber located in the upper part of said smoke box so as to be heated by the furnace gases passing therethrough, means for conveying hot gases from the boiler furnace to the smoke box adjacent to said mixing and heating chamber at a temperature higher than that of the gases ordinarily passing to the smoke box, means for causing said higher temperature gases to flow over and around said chamber, means for supplying steam from the boiler to said chamber, means for supplying air under pressure to said chamber, and an engine to which the heated mixture of steam and air is supplied from the said chamber, substantially as set forth.

13. Apparatus for preparing and applying as motive fluid a heated mixture of steam and air, comprising a steam boiler, a smoke box through which hot gases from the boiler furnace pass, a mixing and heating chamber located in the upper part of said smoke box so as to be heated by the furnace gases passing therethrough, means for conveying hot gases from the boiler furnace to the smoke box adjacent to said mixing and heating chamber at a temperature higher than that of the gases ordinarily passing to the smoke box, passages extending through said chamber, means for causing some of said higher temperature gases to flow through said passages, means for supplying steam from the boiler to said chamber, means for supplying air under pressure to said chamber, and an engine to which the heated mixture of steam and air is supplied from the said chamber, substantially as set forth.

14. Apparatus for preparing and applying as motive fluid a heated mixture of steam and air, comprising a steam boiler, a smoke box through which hot gases from the boiler furnace pass, a mixing and heating chamber located in the upper part of said smoke box so as to be heated by the furnace gases passing therethrough, means for conveying hot gases from the boiler furnace to the smoke box adjacent to said mixing and heating chamber at a temperature higher than that of the gases ordinarily passing to the smoke box, passages extending through said chamber, means for causing said higher temperature gases to flow over and around said chamber and through the passages therein, means for supplying steam from the boiler to said chamber, means for supplying air under pressure to said chamber, and an engine to which the heated mixture of steam and air is supplied from the said chamber, substantially as set forth.

15. Apparatus for preparing and applying as motive fluid a heated mixture of steam and air, comprising a multitubular steam boiler having one of its upper tubes larger than the other tubes, a smoke box through which hot gases from the boiler furnace pass, a mixing and heating chamber located in the upper part of said smoke box adjacent to the outlet end of said larger tube, means for causing the hot gases from said larger boiler tube to flow over and around said chamber, means for supplying steam from the boiler to said chamber, means for supplying air under pressure to said chamber, and an engine to which the heated mixture of steam and air is supplied from the said chamber, substantially as set forth.

16. Apparatus for preparing and applying as motive fluid a heated mixture of steam and air, comprising a multitubular steam boiler having one of its upper tubes larger than the other tubes, a smoke box through which hot gases from the boiler furnace pass, a mixing and heating chamber located in the upper part of said smoke box adjacent to the outlet end of said larger tube, passages extending through said chamber, means for causing the hot gases from said larger boiler tube to flow through said passages, means for supplying steam from the boiler to said chamber, means for supplying air under pressure to said chamber, and an engine to which the heated mixture of steam and air is supplied from the said chamber, substantially as set forth.

17. Apparatus for preparing and applying as motive fluid a heated mixture of steam and air, comprising a multitubular steam boiler having one of its upper tubes larger than the other tubes, a smoke box through which hot gases from the boiler furnace pass, a mixing and heating chamber located in the upper part of said smoke box adjacent to the outlet end of said larger tube, passages extending through said chamber, means for causing hot gases from said larger boiler tube to flow over and around said chamber and through said passages, means for supplying steam from the boiler to said chamber, means for supplying air under pressure to said chamber, and an engine to which the heated mixture of steam and air is supplied from the said chamber, substantially as set forth.

18. Apparatus for preparing and applying as motive fluid a heated mixture of steam and air, comprising a multitubular steam boiler having a number of its upper fire tubes larger than the other tubes, a smokebox through which hot gases from the boiler furnace pass by way of the tubes, a mixing and heating chamber located in the upper part of said smoke box adjacent to the outlet ends of said larger tubes, means for causing the hot gases from said larger boiler tubes to flow over and around said chamber, means for supplying steam from the boiler to said chamber, means for supplying air under pressure to said chamber, and an engine to which the heated mixture of steam and air is supplied from the said chamber, substantially as set forth.

19. Apparatus for preparing and applying as motive fluid a heated mixture of steam and air, comprising a multitubular steam boiler having a number of its upper fire tubes larger than the other tubes, a smoke box through which hot gases from the boiler furnace pass by way of the tubes, a mixing and heating chamber located in the upper part of said smoke box adjacent to the outlet ends of said larger tubes, passages extending through said chamber, means for causing hot gases from said larger boiler tubes to flow through said passages, means for supplying steam from the boiler to said chamber, means for supplying air under pressure to said chamber, and an engine to which the heated mixture of steam and air is supplied from the said chamber, substantially as set forth.

20. Apparatus for preparing and applying as motive fluid a heated mixture of steam and air, comprising a multitubular steam boiler having a number of its upper fire tubes larger than the other tubes, a smoke box through which hot gases from the boiler furnace pass by way of the tubes, a mixing and heating chamber located in the upper part of said smoke box adjacent to the outlet ends of said larger tubes, passages extending through said chamber, means for causing hot gases from said larger boiler tubes to flow over and around said chamber and through the passages therein, means for supplying steam from the boiler to said chamber, means for supplying air under pressure to said chamber, and an engine to which the heated mixture of steam and air is supplied from the said chamber, substantially as set forth.

21. Apparatus for preparing and applying as motive fluid a heated mixture of steam and air, comprising a multitubular steam boiler, a smoke box through which the hot gases from the boiler furnace pass, a mixing and heating chamber of saddle or arch shape in end view, located within the upper part of said smoke box, means for conveying hot gases from the boiler furnace to the smoke box adjacent to said mixing and heating chamber at a temperature higher than that of the gases ordinarily passing to the smoke box, means for supplying steam from the boiler to said chamber, means for supplying air under pressure to said chamber, and an engine to which the heated mixture of steam and air is supplied from the said chamber, substantially as set forth.

22. Apparatus for preparing and applying as motive fluid a heated mixture of steam and air, comprising a multitubular steam boiler, a smoke box through which the hot gases from the boiler furnace pass, a mixing and heating chamber of saddle or arch shape in end view, located within the upper part of said smoke box, means for conveying hot gases from the boiler furnace to the smoke box adjacent to said mixing and heating chamber at a temperature higher than that of the gases ordinarily passing to the smoke box, a steam pipe connecting the boiler to said chamber, an air inlet pipe connected to one of the depending ends of said chamber, an air compressor connected to said pipe, a mixture outlet pipe connected to the other depending end of said chamber, and an engine connected to the latter pipe and to which the heated mixture is supplied, substantially as described.

23. Apparatus for preparing and applying as motive fluid a heated mixture of steam and air comprising a multitubular steam boiler, a smoke box through which the hot gases from the boiler furnace pass, a mixing and heating chamber of saddle or arch shape in end view, located within the upper part of said smoke box, means for conveying hot gases from the boiler furnace to the smoke box adjacent to said mixing and heating chamber at a temperature higher than that of the gases ordinarily passing to the smoke box, a steam pipe connecting the boiler to said chamber, an air inlet pipe connected to one of the depending ends of said chamber, an air compressor connected to said pipe, a perforated pipe located within said chamber and connected to said air inlet pipe, a mixture outlet pipe connected to the other depending end of said chamber, and an engine connected to the latter pipe and to which the heated mixture is supplied, substantially as described.

24. Apparatus for preparing and applying as motive fluid a heated mixture of steam and air, comprising a multitubular steam boiler, a smoke box through which the hot gases from the boiler furnace pass, a mixing and heating chamber of saddle or arch shape in end view, located within the upper part of said smoke box, means for conveying hot gases from the boiler furnace to the smoke box adjacent to said mixing and heating chamber at a temperature higher than that of the gases ordinarily passing to the smoke box, pipes extending through said chamber for the passage of furnace gases, a steam pipe connecting the boiler to said chamber, an air inlet pipe connected to one of the depending ends of said chamber, an air compressor connected to said pipe, a mixture outlet pipe connected to the other depending end of said chamber, and an engine connected to the latter pipe and to which the heated mixture is supplied, substantially as described.

25. Apparatus for preparing and applying as motive fluid a heated mixture of steam and air, comprising a multitubular steam boiler, a smoke box through which the hot gases from the boiler furnace pass, a mixing and heating chamber of saddle or arch shape in end view, located within the upper part of said smoke box, means for conveying hot gases from the boiler furnace to the smoke box adjacent to said mixing and heating chamber at a temperature higher than that of the gases ordinarily passing to the smoke box, pipes extending through said chamber, a steam pipe connecting the boiler to said chamber, an air inlet pipe connected to one of the depending ends of said chamber, an air compressor connected to said pipe, a mixture outlet pipe connected to the other depending end of said chamber, an engine connected to the latter pipe and to which the heated mixture is supplied, and means for causing hot gases to flow over and around said chamber and through the pipes extending through it, substantially as described.

26. Apparatus for preparing and applying as motive fluid a heated mixture of steam and air, comprising a multitubular steam boiler, a smoke box through which the hot gases from the boiler furnace pass, a mixing and heating chamber of saddle or arch shape in end view, located within the upper part of said smoke box, some of the upper boiler fire tubes being larger than the others, a steam pipe connecting the boiler to said chamber, an air inlet pipe connected to one of the depending ends of said chamber, an air compressor connected to said pipe, a mixture outlet pipe connected to the other depending end of said chamber, an engine connected to the latter pipe and to which the heated mixture is supplied, and an adjustable deflector for deflecting the hot gases from the upper larger boiler fire tubes over and around the said chamber.

27. Apparatus for preparing and applying as motive fluid a heated mixture of steam and air, comprising a multitubular steam boiler, a smoke box through which the hot gases from the boiler furnace pass, a mixing and heating chamber of saddle or arch shape in end view, located within the upper part of said smoke box, some of the upper fire tubes of said boiler being larger than the others, pipes extending through said chamber, a steam pipe connecting the boiler to said chamber, an air inlet pipe connected to one of the depending ends of said chamber, an air compressor connected to said pipe, a mixture outlet pipe connected to the other depending end of said chamber, an engine connected to the latter pipe and to which the heated mixture is supplied, an adjustable deflector for deflecting the hot gases from the upper larger boiler fire tubes over and around said chamber, a blast pipe for the exhaust steam, and means for causing the steam blast to induce hot gases to flow over and around said chamber and through the pipes extending through it.

28. Apparatus for preparing and applying as motive fluid a heated mixture of steam and air, comprising a multitubular steam boiler, a smoke box through which the hot gases from the boiler furnace pass, a mixing and heating chamber of saddle or arch shape in end view, located within the upper part of said smoke box, some of the upper boiler fire tubes being larger than the others, pipes extending through said chamber, a steam pipe connecting the boiler to said chamber, an air inlet pipe connected to one of the depending ends of said chamber, an air compressor connected to said pipe, a mixture outlet pipe connected to the other depending end of said chamber, an engine connected to the latter pipe and to which the heated mixture is supplied, an adjustable deflector for deflecting hot gases from the upper and larger boiler fire tubes over and around said chamber, a blast pipe for the exhaust steam, and a louver device for causing the steam blast to induce the flow of hot gases over and around said chamber and through the pipes extending through it.

Signed at London England this 1st day of December 1905.

EDWARD FIELD.

Witnesses:
F. CARNES MORRIS,
H. D. JAMESON.